# 2,967,858

MONOAZO DYESTUFFS OF LOW WATER SOLUBILITY

Ernest Merian, Bottmingen, Basel-Land, Curt Müller, Basel, and Otto Senn, Arlesheim, Basel-Land, Switzerland, assignors to Sandoz Ltd., Basel, Switzerland No Drawing. Filed Feb. 5, 1959, Ser. No. 791,258

Claims priority, application Switzerland Feb. 7, 1958

4 Claims. (Cl. 260—205)

The present invention relates to new monoazo dyestuffs of low solubility in water which correspond to the formula

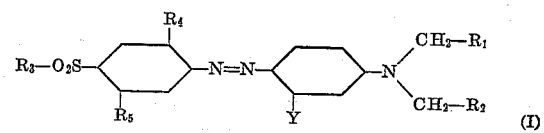

wherein $R_1$ stands for hydrogen, low molecular alkyl, low molecular hydroxyalkyl, low molecular alkoxyalkyl, low molecular acetoxyalkyl, low molecular propionyloxyalkyl, or the radical of a carbamic acid alkyl ester, $R_2$ for low molecular acetoxyalkyl, low molecular propionyloxyalkyl, low molecular cyanoalkyl, or a radical of a carbamic acid alkyl ester, $R_3$ stands for alkyl, alkenyl, cyanoalkyl or halogenalkyl, $R_4$ for halogen, cyano, trifluoromethyl, or a sulfonic acid amide group which may be mono- or disubstituted, $R_5$ for halogen, methyl, ethyl, trifluoromethyl, methoxy or ethoxy, or when $R_4$ stands for cyano, trifluoromethyl or a sulfonic acid amide group which may be mono- or disubstituted, also hydrogen, and Y for hydrogen, halogen, a low molecular alkyl or alkoxy radical, the trifluoromethyl or trifluoroacetylamino radical, or an alkanoylamino radical with not more than 18 carbon atoms.

The process for the production of the new monoazo dyestuffs of low solubility in water consists in coupling 1 mol of the diazo compound of an amine of the general formula

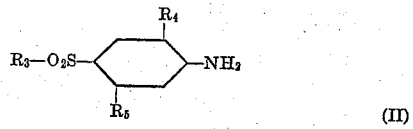

wherein $R_3$, $R_4$ and $R_5$ possess the aforecited meanings, with 1 mol of a compound of the formula

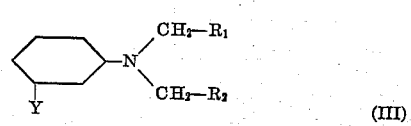

wherein $R_1$, $R_2$ and Y possess the aforecited meanings. The diazo compounds are coupled with the coupling components in an acid medium, which may be buffered.

A certain number of the new monoazo dyestuffs of low water solubility are applicable from aqueous suspension to synthetic polyamide fibers (e.g. nylon, "Perlon," registered trademark), cellulose ester fibers (secondary cellulose acetate and cellulose triacetate), polyvinyl fibers, polyacrylonitrile fibers and polyester fibers (e.g. "Dacron," "Terylene," registered trademarks). On these materials they give brilliant yellow, orange and scarlet shades of high tinctorial strength which are characterized by very good fastness to light, gas fumes, washing, perspiration, water and sea water. The dyeings are white dischargeable. The dyestuffs reserve viscose rayon, cotton and wool, a particularly good reserve being obtained when the goods are aftertreated with hydrosulfites.

With those monoazo dyestuffs of the present invention which possess sufficient affinity for cellulose triacetate and polyester fibers it is possible for the first time to produce on these fibers bright orange shades which are fast to light, pleating, sublimation and heat setting. The solution of this technical problem has been a matter of importance, especially in connection with the dyeing of brown combination shades.

Certain of the new dyestuffs are also suitable for the coloration of lacquers, oils and synthetic resins, and for the mass dyeing of artificial fibers. The shades produced by them in spun-dyed secondary cellulose acetate and cellulose triacetate possess high fastness to light, washing, perspiration, gas fumes, cross dyeing, alkaline bleaching, oxalic acid, dry cleaning, and peroxide bleaching, together with excellent fastness to water, sea water, soap baths, crocking, decatizing, and pressing.

In the examples which follow the parts and percentages are by weight and the temperatures in degrees centigrade. The melting points are uncorrected.

Example 1: 24.5 parts of 1-amino-2.5-dichloro-4-methylsulfonylbenzene are added to 130 parts of concentrated sulfuric acid at 60°. 7 parts of solid sodium nitrite are added to the solution in the course of 1 hour; the reaction mass is stirred for a further hour at 60° and then run into a mixture of 500 parts of ice and 200 parts of water. Any excess of nitrous acid which may be present is destroyed by an addition of 0.5 part of amidosulfonic acid. 18 parts of N-ethyl-N-cyanoethylaminobenzene (B.P.$_{0.1}$ 115°) are added to the resulting diazo solution. Formation of the dyestuffs takes place instantaneously. The dyestuff paste formed is filtered off, the residue washed free of acid, and dried. The new dyestuff corresponds to the formula

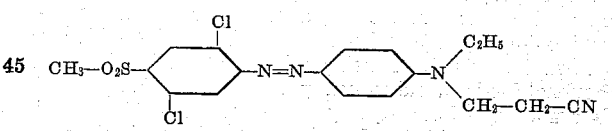

(Melting point 157–158°.)

It dyes secondary cellulose acetate and triacetate, polyamide fibers and polyester fibers in brilliant orange shades of high tinctorial strength possessing good fastness to light and excellent fastness to washing, perspiration, sea water, gas fumes, sublimation, pleating and cross dyeing. The dyeings are readily dischargeable and the dyestuff reserves viscose rayon and cotton very well. The wool reserve also is reasonably good and can be improved by suitable aftertreatment, e.g. with hydrosulfite.

A dyebath is prepared with 1 part of the dyestuff of this example, dispersed with the aid of Turkey red oil, 6 parts of a sulfonated fatty alcohol and 3000 parts of water. 100 parts of a secondary acetate fabric are entered at room temperature and the temperature of the dyebath is increased to 80° in 1 hour and maintained at 80° for a further 1 hour. After this time the dyeing process is completed. The dyed goods are removed, rinsed and dried.

The following dyestuffs are produced in an analogous manner and possess similar dyeing properties: 4-(N-methyl - N - cyanoethyl) - amino - 2′.5′ - dichloro - 4′-methylsulfonylazobenzene (Example 2), M.P. 176–177°;

4 - (N - propyl - N - cyanoethyl) - amino - 2',5' - dichloro-4'-methylsulfonyl-azobenzene (Example 3), M.P. 184-185°; 4 - (N - butyl - N - cyanoethyl) - amino - 2'.5'-dichloro-4'-methylsulfonyl azobenzene (Example 4), M.P. 176-177°; and 4-(N-acetoxyethyl-N-cyanoethyl)-amino - 2'.5' - dichloro - 4' - methylsulfonylazobenzene (Example 5), M.P. 112–114° which has a slightly more yellowish shade.

Example 6: 190.5 parts of 1-chloro-4-methylsulfonylbenzene are added to 750 parts of chlorosulfonic acid at 50-70°. The temperature of the solution is increased to 140° in 4 hours. After a reaction time of 16 hours at 140°, the reaction mass is allowed to cool and run into 2350 parts of ice and 350 parts of water, whereupon 1-chloro-4-methylsulfonylbenzene-2-sulfonic acid chloride is precipitated. It is isolated by filtration and washed free of acid. The press cake obtained is added to 240 parts of a 25% aqueous solution of ammonia at 35-45° and the resulting suspension is stirred for 6 hours at 30-40° and for a further 12 hours at 20°. The 1-chloro-4-methylsulfonylbenzene-2-sulfonic acid amide formed is isolated by filtration, washed until of neutral reaction, and dried. The melting point of the crude product is 206-209° and that of the pure product 223°. 82.5 parts of the sulfonic acid amide obtained in this way, together with 0.3 part of copper bronze and 166 parts of a 25% aqueous ammonia solution, are heated in a closed vessel to 140-150° in the course of 6 hours. Subsequently, the mass is stirred for 24 hours at the same temperature and then allowed to cool to room temperature. The precipitate, a new intermediate product, 1-amino-4-methylsulfonylbenzene-2-sulfonic acid amide, has the formula

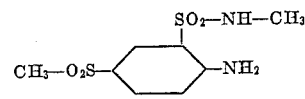

It is filtered off, neutralized by washing with water, and dried. The crude product melts at 170-200°, the pure product at 213°.

7.8 parts of sodium nitrite are dissolved in 90 parts of concentrated sulfuric acid at 60-70° and the solution cooled to 5-10°. A mixture of solvents consisting of 15 parts of propionic acid and 90 parts of acetic acid is run in at the same temperature, after which 25 parts of 1-amino-4-methylsulfonylbenzene-2-sulfonic acid amide are strewn in. The diazotizing mixture is stirred for 2-3 hours at 0-5° and subsequently a solution of 23.2 parts of N-cyanoethyl-N-acetoxyethylaminobenzene in 80 parts of acetic acid is added. Coupling begins immediately and the dyestuff formed is dissolved. An addition of 400 parts of ice is made to accelerate the rate of reaction and the dyestuff is then slowly precipitated. It is isolated by filtration, washed free of acid, and dried. It melts in the crude state at 205-210°, and dissolves in organic solvents and concentrated sulfuric acid to give orange solutions. It dyes cellulose ester fibers in fast, bright orange shades.

The corresponding dyestuff from N-cyanoethyl-N-acetoxypropylaminobenzene (Example 7) also dissolves in organic solvents and concentrated sulfuric acid with an orange coloration and possesses similar dyeing properties.

Example 8: 190.5 parts of 1-chloro-4-methylsulfonylbenzene are converted by the process described in Example 6 into the 2-sulfonic acid chloride, which is subsequently added to 383 parts of a 35% methylamine solution at 20-40°. The mixture is stirred for 5 hours at 30-40° and for the next 12 hours at 20°. The 1-chloro-4 - methylsulfonylbenzene - 2 - sulfonic acid methylamide formed is isolated by filtration, neutralized by washing, and dried. The crude product melts at 107-111°, and the pure product at 127°. 108 parts of the substituted sulfonic acid amide so formed, with 0.3 part of copper bronze and 180 parts of 25% ammonia, are converted by the method described in Example 6 into the new intermediate product 1-amino-4-methylsulfonylbenzene-2-sulfonic acid methylamide of the formula

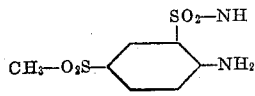

This intermediate melts at 140-145° in the crude state and at 152° in the pure state.

26.4 parts of 1-amino-4-methylsulfonylbenzene-2-sulfonic acid methylamide are stirred into 124 parts of water and 44 parts of concentrated hydrochloric acid. After the addition of 100 parts of ice the amine is diazotized by dropwise addition of an aqueous solution of 7 parts of sodium nitrate at 0-5°. The diazotizing solution is then added to a solution of 24.6 parts of N-cyanoethyl-N-β-acetoxypropylaminobenzene in 40 parts of ice and 46 parts of concentrated hydrochloric acid. Coupling follows immediately and the new dyestuff is precipitated, filtered off, washed free of acid, and dried. It has the formula:

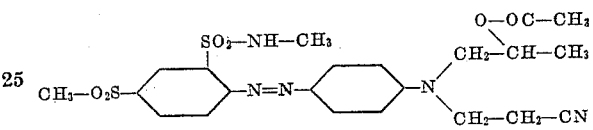

It melts at 99° and dissolves in organic solvents and concentrated sulfuric acid with an orange coloration. It dyes cellulose ester fibers in fast, bright orange shades.

The corresponding dyestuff from N-cyanoethyl-N-β-acetoxyethylaminobenzene (Example 9) with melting point at 195° also dissolves in organic solvents and concentrated sulfuric acid to give orange solutions and possesses similar dyeing properties.

Example 10: 23.9 parts of 1-amino-2-trifluoromethyl-4-methylsulfonylbenzene are dissolved in 140 parts of concentrated sulfuric acid at 60°. In the course of 1 hour 7 parts of sodium nitrite are added at 60-70° to diazotize the amine. The resulting brown solution is allowed to cool and run into 300 parts of ice. The diazo solution obtained is combined with a solution of 16 parts of N-ethyl-N-cyanoethylaminobenzene in 50 parts of glacial acetic acid. The dyestuff formed is filtered off, washed free of acid, and dried. It dyes secondary cellulose acetate, triacetate and polyester fibers from aqueous dispersion, if desired in presence of carriers. The red-orange shades obtained are outstandingly fast to light, washing and sublimation; the dyestuff gives an excellent reserve of cotton and viscose rayon and it is white dischargeable.

Example 11: A nitrosyl sulfuric acid, produced by adding 7 parts of sodium nitrite to 50 parts of concentrated sulfuric acid at 60°, is diluted with a mixture of 80 parts of glacial acetic acid and 20 parts of propionic acid at 10° with vigorous stirring and external cooling. 19.6 parts of 1-amino-2-cyano-4-methylsulfonylbenzene are added to the resulting solution. The diazotizing mass thus obtained is stirred for 2 hours at 10°, and subsequently a solution of 22 parts of N-acetoxyethyl-N-cyanoethylaminobenzene in 50 parts of glacial acetic acid is added. The coupling reaction is quickly initiated; it can be speeded up by the addition of sodium acetate. The precipitated dyestuff is filtered off in the normal way, washed free of acid, and dried. It dyes cellulose acetate and triacetate, polyester and polyacrylonitrile fibers from aqueous dispersion, if desired in presence of carriers, in red-orange shades of outstanding fastness to light, washing and sublimation. The reserve of cotton and viscose rayon is excellent and the dyeings are white dischargeable. In the following Table 1 further monoazo dyestuffs are recited which may be produced in an analogous manner as described in the foregoing examples. They correspond to the general Formula I.

Table 1

| Ex. | R₁ | R₂ | R₃ | R₄ | R₅ | Y | Shade |
|---|---|---|---|---|---|---|---|
| 12 | CH(CH₃)₂ | CH₂—CN | CH₃ | Br | Br | H | Orange. |
| 13 | CH₃ | CH₂—CN | C₂H₅ | Cl | Cl | CH₃ | Red-orange. |
| 14 | C₃H₇ | CH₂—CN | C₄H₉ | Cl | Cl | CH₃ | Do. |
| 15 | CH₂—OH | CH₂—CN | CH₂—CH=CH₂ | Cl | Cl | CH₃ | Do. |
| 16 | CH₂—CH(CH₃)—OH | CH₂—CN | CH₂—CH₂—CN | Cl | Cl | H | Orange. |
| 17 | CH₂—O—CH₃ | CH₂—CN | CH₂—CH₂—Cl | Cl | Cl | H | Do. |
| 18 | C₂H₄—O—CH₃ | CH₂—CN | CH₂—CH₂—Br | Cl | Cl | H | Do. |
| 19 | CH₂—O—CO—CH₃ | CH₂—O—CO—CH₃ | CH₂—CH(CH₃)—CN | Cl | Cl | H | Do. |
| 20 | CH(CH₃)—O—CO—CH₃ | CH(CH₃)—O—CO—CH₃ | CH₂—CH(CH₃)—Cl | Cl | Cl | Cl | Do. |
| 21 | CH₂—O—CO—C₂H₅ | CH₂—O—CO—C₂H₅ | CH₃ | Cl | CH₃ | Br | Do. |
| 22 | CH(CH₃)—O—CO—C₂H₅ | CH(CH₃)—O—CO—C₂H₅ | CH₃ | Cl | C₂H₅ | C₂H₅ | Red-orange. |
| 23 | CH₂O—CO—CH₃ | CH₂—O—CO—CH₃ | CH₃ | Cl | CF₃ | CH₃ | Do. |
| 24 | CH₂O—CO—CH₃ | CH₂—O—CO—CH₃ | CH₃ | Cl | O—CH₃ | CF₃ | Do. |
| 25 | CH₂O—CO—CH₃ | CH₂—O—CO—CH₃ | CH₃ | Cl | O—C₂H₅ | Cl | Orange. |
| 26 | CH₃ | CH(CH₃)—CN | CH₃ | Br | Br | H | Do. |
| 27 | C₂H₄—O—CO—NH—C₂H₅ | C₂H₄—O—CO—NH—C₂H₅ | CH₃ | SO₂—N—(CH₃)₂ | H | CH₃ | Red-orange. |
| 28 | CH₃ | C₂H₄—O—CO—NH—C₂H₅ | CH₃ | SO₂—NH—C₃H₇ | H | CH₃ | Do. |
| 29 | CH₃ | CH₂—O—CO—CH₃ | CH₃ | SO₂—NH—CH₂—CH₂—CN | H | CH₃ | Do. |
| 30 | CH₂—CH₂—O—CO—CH₃ | CH₂—CN | CH₃ | SO₂—N—CH₂—CH₂—OH / CH₃ | H | H | Orange. |
| 31 | CH₂—O—CO—CH₃ | CH₂—O—CO—CH₃ | CH₃ | Cl | Cl | NH—CO—CH₃ | Red-orange. |
| 32 | CH₂—O—CO—CH₃ | CH₂—O—CO—CH₃ | CH₃ | CN | H | NH—CO—C₂H₅ | Scarlet. |
| 33 | CH₂—O—CO—CH₃ | CH₂—O—CO—CH₃ | CH₃ | CF₃ | H | NH—CO—CF₃ | Red-orange. |
| 34 | H | CH₂—CN | CH₃ | CF₃ | H | H | Orange. |
| 35 | CH₃ | CH₂—CN | CH₂—CH₂—CN | CF₃ | H | H | Do. |
| 36 | CH₂—O—CO—CH₃ | CH₂—CN | CH₃ | CF₃ | H | H | Do. |
| 37 | CH(CH₃)—O—CO—CH₃ | CH₂—CN | CH₃ | CF₃ | H | H | Do. |
| 38 | CH(CH₃)—O—CO—CH₃ | CH₂—CN | CH₃ | CN | H | H | Red-orange. |
| 39 | CH₂—O—CO—CH₃ | CH₂—O—CO—CH₃ | CH₃ | CN | H | H | Do. |
| 40 | CH₂—O—CO—CH₃ | CH₂—CN | C₂H₅ | CN | H | H | Do. |
| 41 | CH₂—O—CO—CH₃ | CH₂—O—CO—CH₃ | CH₃ | CN | H | CH₃ | Do. |
| 42 | H | CH₂—CN | CH₃ | CN | H | H | Do. |
| 43 | CH₃ | CH₂—CN | CH₃ | CN | H | H | Do. |
| 44 | CH₂—O—CO—CH₃ | CH₂—O—CO—CH₃ | CH₃ | CN | H | NH—CO—C₂H₅ | Scarlet. |

The dyestuffs 4'-bis-(N-acetoxyethyl)-amino-2'-decanoyl-amino-2-cyano-4-methylsulfonyl-1,1'-azobenzene (Example 45) and 4'-bis-(N-phenylcarbamic acid ethyl ester)-amino-2'-chloro-2-cyano-4-methylsulfonyl-1,1'-azobenzene (Example 46) are suitable for the production of fast, brilliant scarlet dyeings in the mass. Of especial interest is the dyestuff which is obtained when the coupling component used in Example 1 is replaced by an equivalent amount of 1-bis-(N-phenylcarbamic acid ethyl ester)-amino-3-chlorobenzene (Example 47).

In the following Table 2 further monoazo dyestuffs are recited which may be produced in an analogous manner as described in the foregoing examples and which are suitable for dyeing di- and triacetate fibers in the mass and which correspond to the formula Example 59: The spin dyeing method is as follows:
100 parts of secondary cellulose acetate are added to 300 parts of a mixture of solvents consisting of 93% of acetone and 7% of methanol. The mass is stirred for a short time and left overnight to swell. 1 part of the monoazo dyestuff of Example 48 is dissolved in 60 parts of the same mixture of solvents by simple shaking. This solution is added to the cellulose acetate solution and the whole is stirred in an open vessel until 60 parts of the solvent mixture have evaporated. The dyed mass is pumped into the spinning machine and spun in the normal way. The filaments are dyed to an orange shade which has good fastness properties.

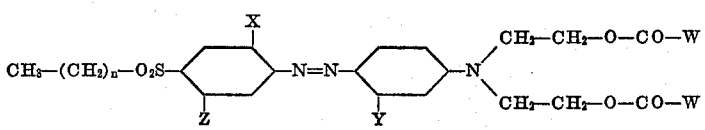

Table 2

| Example | n | X | Y | Z | W | Shade |
|---|---|---|---|---|---|---|
| 48 | 0 | Cl | —NH—CO—C₃H₇ | Cl | —NH—C₈H₁₇ | Red-orange. |
| 49 | 0 | Cl | —NH—CO—C₁₇H₃₅ | Cl | CH₃ | Do. |
| 50 | 0 | —SO₂—N(C₄H₉)₂ | Cl | H | —NH—C₆H₅ | Do. |
| 51 | 0 | —SO₂—NH—C₆H₁₃ | Cl | H | —NH—C₆H₅ | Do. |
| 52 | 0 | —SO₂—N(C₄H₉)—C₆H₅ | Br | H | —NH—C₆H₅ | Do. |
| 53 | 0 | —SO₂—N(CH₂—CH₂—OH)₂ | Cl | H | —NH—C₆H₄—CH₃ | Do. |
| 54 | 0 | Cl | Cl | Cl | —NH—C₆H₁₃ | Orange. |
| 55 | 0 | Cl | Cl | Cl | —NH—C₂H₅ | Do. |
| 56 | 0 | —SO₂—NH—(CH₂)₃—O—CH₃ | Cl | H | —NH—C₁₀H₇ | Red-orange. |
| 57 | 3 | Cl | Cl | Cl | —NH—C₆H₅ | Orange. |
| 58 | 3 | Cl | Cl | Cl | —NH—C₆H₅ | Do. |

Formulae of representative dyestuffs of the foregoing examples are as follows:

Example 1—

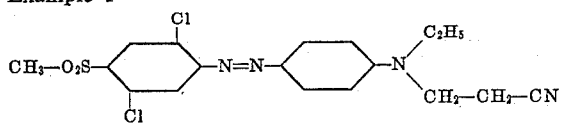

Example 2—

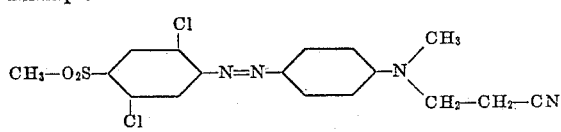

Example 5—

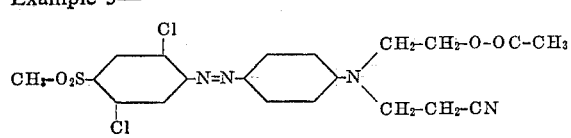

Example 9—

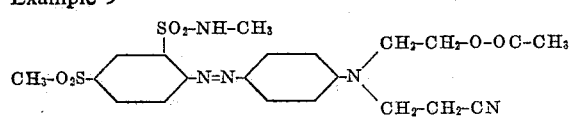

Example 43—

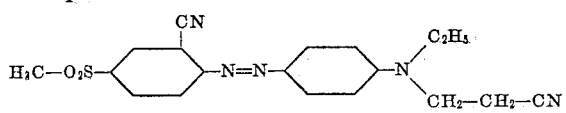

Having thus disclosed the invention what we claim is:

1. A monoazo dyestuff of low solubility in water, of the formula

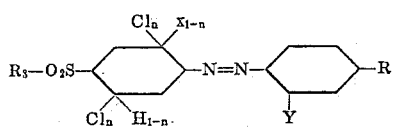

wherein $R_3$ represents a member selected from the group consisting of lower alkyl, allyl, lower cyanoalkyl, lower chloroalkyl and lower bromoalkyl, $x$ represents a member selected from the group consisting of cyano, trifluoromethyl and sulfonic acid lower alkylamide, $y$ represents a member selected from the group consisting of hydrogen, chlorine, lower alkyl, trifluoroacetylamino and alkanoylamino with not more than 18 carbon atoms, $n$ represents a member selected from the group consisting of 1 and 0, and R is selected from the group consisting of

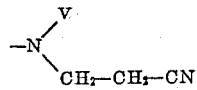

and

wherein V represents a member selected from the group consisting of lower alkyl and lower hydroxyalkyl, and $W_1$ represents a member selected from the group consisting of lower acetoxyalkyl, propionyloxyalkyl, alkyl-substituted carbamic acid alkyl ester and phenyl-substituted carbamic acid alkyl ester.

2. The monoazo dyestuff which corresponds to the formula

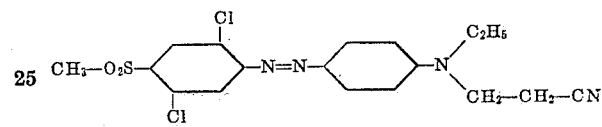

3. The monoazo dyestuff which corresponds to the formula

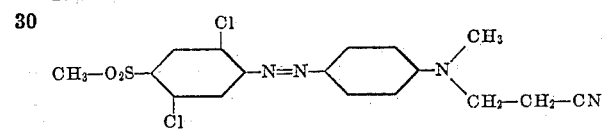

4. The monoazo dyestuff which corresponds to the formula

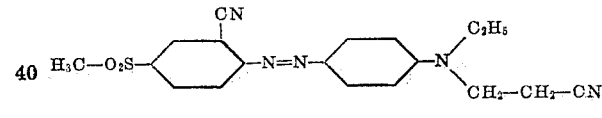

References Cited in the file of this patent
UNITED STATES PATENTS

| | | |
|---|---|---|
| 2,082,156 | Felix et al. | June 1, 1937 |
| 2,109,024 | Holzach et al. | Feb. 22, 1938 |
| 2,151,857 | Manz et al. | Mar. 28, 1939 |
| 2,891,942 | Merian | June 23, 1959 |